E. PITCHER.
Improvement in Fish-Hooks.
No. 129,053. Patented July 16, 1872.
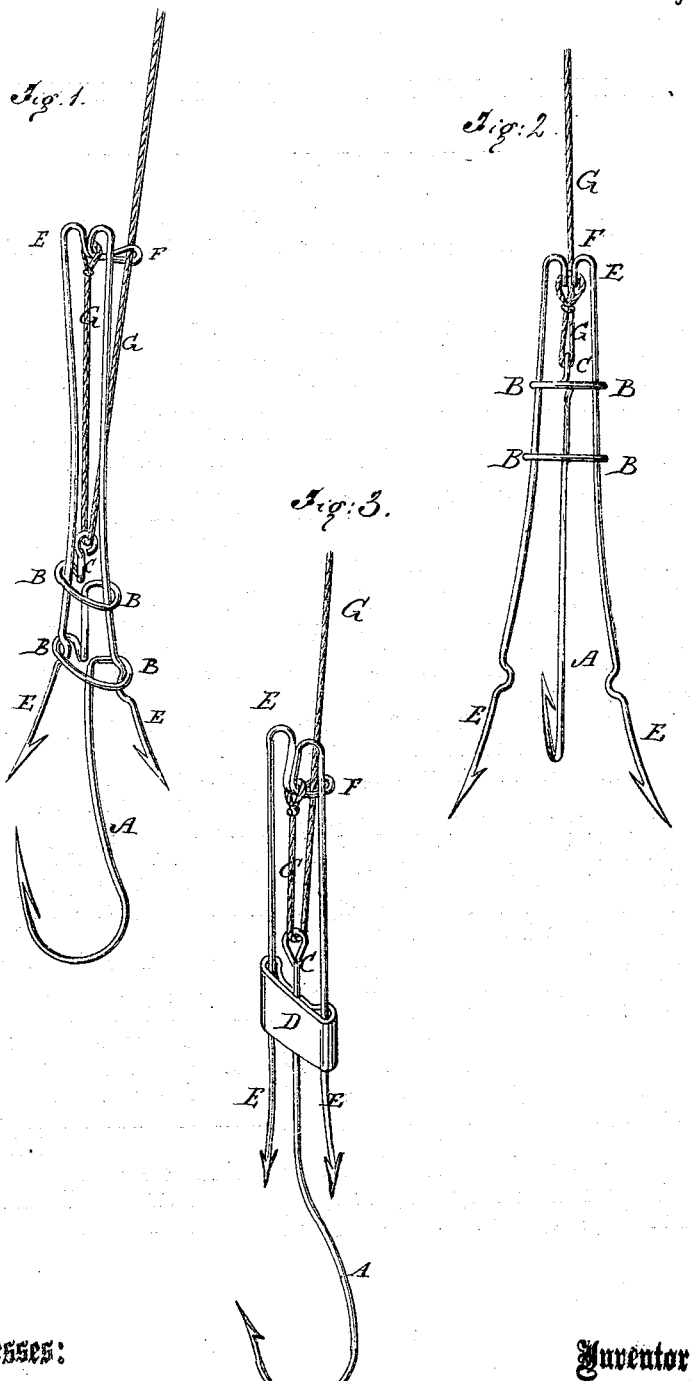
Witnesses:
Chas. Nida
W. O. Graham
Inventor:
Edward Pitcher
PER
Attorneys.

UNITED STATES PATENT OFFICE.

EDWARD PITCHER, OF BROOKLYN, NEW YORK.

IMPROVEMENT IN FISH-HOOKS.

Specification forming part of Letters Patent No. 129,053, dated July 16, 1872.

Specification describing a new and useful Improvement in Fish-Hooks, invented by EDWARD PITCHER, of Brooklyn, in the county of Kings and State of New York.

Figure 1 is a perspective view of my improved fish-hook arranged for use. Fig. 2 is a view of the same in position for holding the fish. Fig. 3 represents a modification of the same.

Similar letters of reference indicate corresponding parts.

My invention has for its object to furnish an improved fish-hook, which shall be so constructed as to prevent the fish from getting off the hook and being thus lost, as so often happens with the ordinary hooks; and it consists in the construction and combination of various parts of the hook, as hereinafter more fully described.

A represents a hook formed in the ordinary manner, except the shank, which is bent to form two pairs of rings, loops, or eyes, B, and has a fifth ring, loop, or eye, C, formed upon its end, as shown in Figs. 1 and 2. If desired, a small plate, D, may be attached to the shank of the hook A instead of the rings C, said plate having two tubular openings formed in it, as shown in Fig. 3. E is a U-shaped spear, having points and barbs similar to the point and barb of a fish-hook formed upon its ends. The arms of the U-shaped spear E pass through the ring C or the tubular openings of the plate D. At the top or bend of the U-shaped spear E is formed a ring, loop, or eye, F, as shown in Figs. 1, 2, and 3. G represents the fish-line, which is passed through the ring F, through the ring C, and its upper end is attached to the ring F, as shown in Figs. 1, 2, and 3. The hook is set or adjusted for use by slipping the hook A down upon the spear E, as shown in Fig. 1, the line G drawing through the rings C F.

As the fish, in taking the hook, draws upon it, the spear E is drawn down, piercing him and rendering it impossible for him to get away from the hook, the tension of the line G holding the spear E pressed firmly against or into him. The arms of the spear E, a little above their points, have bends formed in them to receive the lower rings B, to prevent the spear from being drawn down by its own weight.

Having thus described my invention, I claim as new and desire to secure by Letters Patent—

1. The combination of the U-shaped spear E, having a ring, loop, or eye formed upon it at its bend, with the rings, loops, or eyes B, or equivalent plate D, and loop, ring, or eye C formed upon or attached to the shank of a fish-hook, A, substantially as herein shown and described, and for the purpose set forth.

2. The arrangement of the line G, in connection with the hook A B C and U-shaped spear E F, substantially as herein shown and described, and for the purpose set forth.

EDWARD PITCHER.

Witnesses:
JAMES T. GRAHAM,
T. B. MOSHER.